Inventor:
Howard E. Van Valkenburg,
by *Richard E. Hosley*
His Attorney.

# United States Patent Office 2,700,894
Patented Feb. 1, 1955

2,700,894
APPARATUS FOR ULTRASONIC INVESTIGATION

Howard E. Van Valkenburg, Schenectady, N. Y., assignor to General Electric Company, a corporation of New York Application April 30, 1949, Serial No. 90,608

4 Claims. (Cl. 73—67)

This invention relates to an improved apparatus for ultrasonic investigation and in particular to an apparatus employing frequency modulation of ultrasonic waves.

An object of the invention is to provide an improved apparatus for using ultrasonic waves to investigate properties of liquids.

Another object is to provide an improved apparatus for making rapid, accurate determinations of the proportions of liquids in a mixture.

Another object is to provide an improved apparatus for continuously monitoring the composition and other characteristics of liquids.

Another object is to provide an improved apparatus for determining sound velocities in liquids.

Other objects and advantages will appear as the description proceeds.

Figure 1:
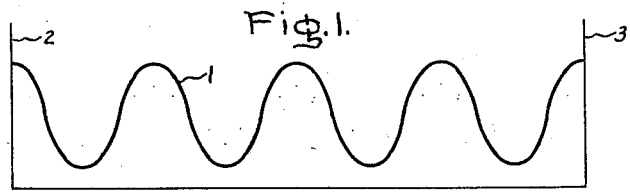
Figure 2:
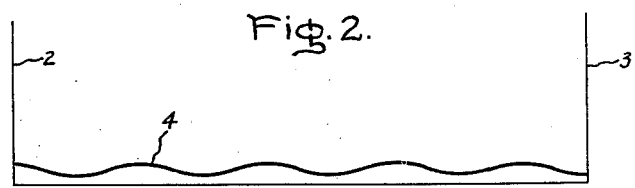
Figure 3:
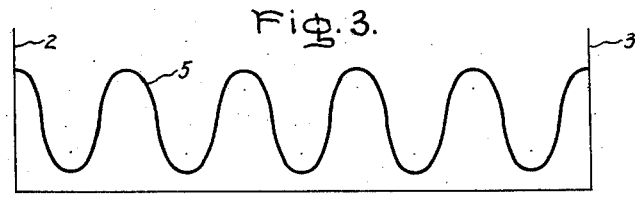
Figure 4:
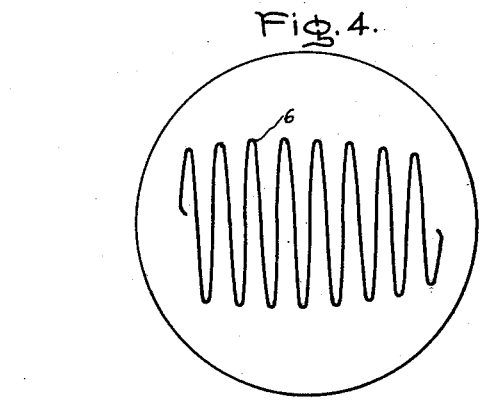
Figure 5:
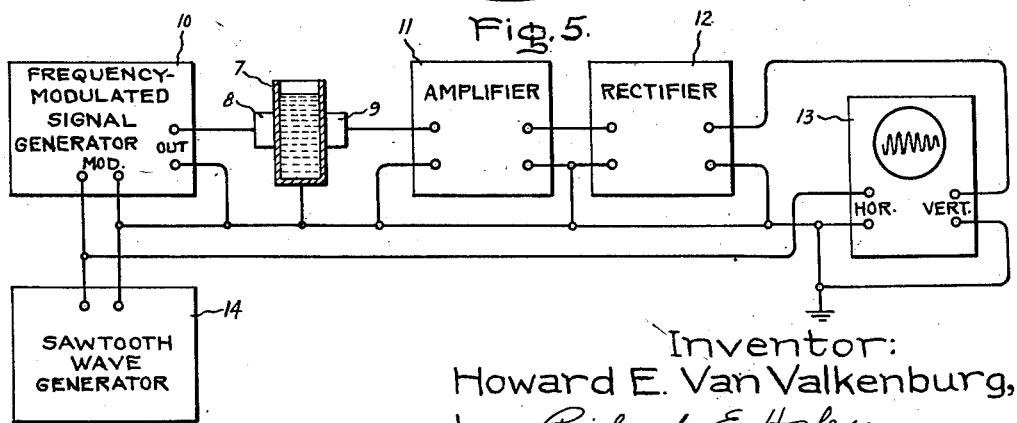

Reference is made in the following description to the accompanying drawings in which Figs. 1, 2, and 3 are graphical representations of standing wave patterns hereinafter described; Fig. 4 represents an oscillograph trace; and Fig. 5 is a schematic diagram of apparatus constructed in accordance with this invention.

When using this invention to investigate properties of liquids, the liquid to be investigated is confined in a container having fixed lateral dimensions. For example, the container may be a small rectangular tank in which a sample of the liquid can be placed, or it may be a rectangular channel through which a liquid to be monitored flows continuously. Ultrasonic waves are transmitted into the liquid from one side of the container. These waves travel through the liquid and are reflected from the opposite side of the container. If the width of the container is equal to some integral multiple of the half-wavelength of ultrasonic waves transmitted through the liquid, the reflected waves reinforce the oncoming waves, and standing waves of large amplitude result. When the width of the container is equal to an odd number of quarter-wavelengths, the reflected waves oppose the oncoming waves, and the resultant standing wave pattern has a relatively small amplitude.

Refer now to Fig. 1, in which curve 1 represents a standing wave pattern obtained when the width of the container is an integral multiple of the half-wavelength of ultrasonic waves transmitted through the liquid in the container. In this case the width of the container is equal to four half-wavelengths, so there are four standing waves. Vertical line 2 may represent the side of the container from which ultrasonic waves are transmitted, and vertical line 3 may represent the opposite side of the container. The ultrasonic waves are reflected back and forth between the two sides, and at each reflection the reflected waves reinforce the oncoming waves to produce standing waves having a relatively large amplitude.

If the frequency of the ultrasonic waves is increased, their wavelength decreases correspondingly. Refer now to Fig. 2, in which curve 4 represents the standing wave pattern obtained when the wavelength is such that the width of the container is equal to nine quarter-wavelengths. In this case, each reflected wave opposes the oncoming waves, and the resulting standing wave pattern has a relatively small amplitude.

A further increase in frequency will increase the amplitude of the standing waves. Refer now to Fig. 3 in which the wavelength is such that the width of the container is equal to five half-wavelengths. Curve 5 represents the large standing waves obtained. The conditions shown in Figs. 1 and 3 are commonly called "resonances," since they are associated with waves of much larger amplitude than those produced under other conditions.

This invention includes frequency modulation of the ultrasonic waves transmitted into the liquid, so that during each modulation cycle a number of resonances are obtained. The amplitude of vibrations transmitted through the liquid to the side of the container opposite the transmitter is measured in the manner hereinafter described. At resonance the amplitude thus measured is maximum, because the amplitude of the standing waves is maximum and also because the point of measurement corresponds to a standing wave peak. Under the conditions illustrated in Fig. 2, the amplitude measured is a minimum because the standing waves have minimum amplitude and also because the point of measurement corresponds to a standing wave trough. Thus a maximum measurement is obtained each time the frequency of the frequency-modulated ultrasonic waves pass through a value such that the width of the container is an integral multiple of the half-wavelength of the waves.

Preferably, measurement of the amplitude of waves transmitted through the liquid to the side of the container opposite the transmitter is made by means including a transducer which transforms ultrasonic waves into electrical signals. These signals may then be amplified, rectified, and applied to the amplitude, or vertical, input of a cathode ray oscillograph. Another electric signal which is in phase with the modulation frequency of the supersonic waves may be applied to the sweep, or horizontal, input of the oscillograph. At each instant, the oscillograph spot will then have a vertical position determined by the amplitude of the ultrasonic waves transmitted through the liquid, and a horizontal position determined by their frequency at that instant.

Refer now to Fig. 4, in which curve 6 represents the resulting trace on the face of the oscillograph tube. Each peak of this trace represents a resonance. In the trace shown in Fig. 4, there are eight peaks which shows that eight resonances are passed through during each modulation cycle as the frequency-modulated ultrasonic wave is swept through a range of frequency values. It will be assumed that this range of frequencies is known. If it is not, it may be determined easily by methods known in the art, for example, by a wavemeter attached to the signal generating apparatus.

The velocity $v$ of the ultrasonic waves through the liquid is given by the formula $$v = \frac{2a\Delta f}{n}.$$

where $a$ is the width of the container, $\Delta f$ is the difference between the highest and the lowest frequencies of the supersonic waves during each modulation cycle, and $n$ is the number of resonances passed through.

For example, suppose that a container five centimeters wide is used, and the frequency of the ultrasonic waves is swept from $9.5 \times 10^5$ cycles per second to $10.5 \times 10^5$ cycles per second, a range of $10^5$ cycles per second, during each modulation cycle. When the container is filled with pure water, seven peaks may be observed on the oscillograph trace. Substituting in the formula $a=5$, $\Delta f=10^5$, and $n=7$, it can be determined that the velocity of sound through water is $1.43 \times 10^5$ centimeters per second. When pure denatured alcohol is placed in the container, all other factors remaining the same, eight peaks are observed on the oscillograph trace. Again substituting the known values in the equation, it is found that the velocity of sound through denatured alcohol is $1.25 \times 10^5$ centimeters per second.

Mixtures of alcohol and water produce sound velocities which are intermediate in value between those of the two pure liquids. The respective velocities for a number of alcohol-water mixtures having known proportions may be determined, and this data may be then used to prepare a calibration curve of sound velocity versus the percentage of alcohol in the liquid. Then the percentage of alcohol in alcohol-water mixtures for which the proportions are unknown can be determined by measuring the sound velocity by the method which has been described, and locating the measured velocity on the calibration curve to determine the proportions of the mixture.

Although it is possible to estimate fractional cycles of the oscillograph trace, it will be appreciated that more than seven or eight resonances will usually be needed if great accuracy is to be obtained. In actual practice, the number of resonances passed through during each modulation cycle may be in the order of 50 to several hundred. Since for any given liquid the number of resonances is proportional to the product of the container width and the frequency difference between the highest and lowest frequencies through which the frequency-modulated ultrasonic wave is swept, the number of resonances can be increased as desired simply by increasing the width of the container, the band width of the frequency modulation, or both. Preferably, the center frequency of the frequency-modulated waves is in the order of $10^6$ cycles per second or more, and the ratio of frequency sweep to center frequency, $$\frac{\Delta f}{f}$$

is reasonably small.

An important application of this invention is in the continuous monitoring of liquids in industrial processes. Suppose, for example, that a liquid at a certain location in a chemical process is a mixture whose proportions must be controlled. Also, suppose that one or more of the constituents of the liquid are subject to polymerization if proper conditions are not maintained. This invention may be used to continuously monitor the liquid and instantly indicate any deviation from the correct proportions, or a polymerization.

The liquid to be monitored may, for example, flow through a channel of fixed width. Ultrasonic waves are transmitted into the liquid at one side of the channel, and the transducer of the measuring equipment is placed adjacent to the opposite side of the channel. Any change in the proportions of constituents of the liquid will change the number of resonant peaks observed in the oscillograph trace. A polymerization, on the other hand, will change the ratio of energy transmitted through the liquid to energy absorbed by the liquid, and will therefore change the amplitude of the oscillograph trace. Thus, whenever either change occurs, there will be an immediate and easily recognizable change in the oscillograph trace which will indicate the nature and extent of the change within the liquid.

As has been explained, this invention provides means for the convenient and accurate measurement of sound velocity in liquids. It may be applied with greater convenience and less expense than conventional means using acoustic interferometers having carefully constructed and calibrated movable plates, since the present invention comprises relatively inexpensive and rugged electronic apparatus.

Refer now to Fig. 5, which shows one form of apparatus constructed in accordance with this invention. The liquid to be monitored is placed in the container 7. The container has two opposite parallel walls which are sufficiently thin that ultrasonic waves may be easily transmitted through the walls. Attached to the outer surfaces of the two opposite walls are transducers 8 and 9, which may be X-cut quartz crystals for example. Crystal 8 is a transmitting transducer which transmits ultrasonic waves into the liquid. Crystal 9 is a receiving transducer which transforms ultrasonic waves into electric signals.

A frequency-modulated signal generator 10 provides frequency-modulated electric excitation to crystal 8. Crystal 8 vibrates responsive to the voltage across it, and thus generates the ultrasonic waves which are transmitted into the liquid. Receiving crystal 9 produces a voltage in response to vibrations transmitted through the liquid; and this voltage is amplified by a suitable amplifier 11, rectified by a rectifier 12, and applied to the vertical input of a cathode ray oscillograph 13. The voltage produced by crystal 9 is a high-frequency voltage, having the same frequency as the ultrasonic waves, which is amplitude modulated by the variations in amplitude of the ultrasonic waves which result from the successive resonances passed through during each modulation cycle. The rectifier acts as a detector or amplitude demodulator, so that the voltage applied to the vertical input of the oscillograph is proportional to the amplitude of the high-frequency voltage generated by crystal 9.

The modulation frequency is preferably determined by a sawtooth-wave generator 14. This generator provides an electric signal which preferably has a sawtooth waveform. This signal is applied to the modulation input of the frequency-modulated signal generator, and controls the frequency sweep of the generator output in the usual manner. Therefore, there is a fixed phase relationship between the sawtooth waveform signal and the modulation of the supersonic waves. The sawtooth-wave electric signal is also applied to the horizontal, or sweep, input of the oscillograph, so that the instantaneous horizontal position of the oscillograph spot has a fixed relation to the instantaneous frequency of the supersonic waves transmitted into the liquid.

Preferably, the transmitting transducer and the receiving transducer are on opposite sides of the container, as has been described. However, since resonances affect the amplitude of standing waves on both sides of the container, both transducers can be located on the same side.

Having described the principle of this invention and the best mode in which I have contemplated applying that principle, I wish it to be understood that the examples described are illustrative only, and that other means and applications within the true scope of the invention will occur to those skilled in the art.

What I claim as new and desire to secure by Letters Patent of the United States is:

1. An apparatus for determining sound velocity in a fluid comprising a container having fixed lateral dimensions within which said fluid is confined, a transmitting transducer attached to an outer lateral surface of said container, a receiving transducer attached to an outer lateral surface of said container and spaced from said transmitting transducer, means for supplying electrical signals to said transmitting transducer and varying the frequency of said signals through a predetermined range, said frequency range being approximately 100 kilocycles centered in the neighborhood of one megacycle, thereby including a plurality of resonant frequencies of the fluid-filled container, and means connected to said receiving transducer for deriving a measure of the number of resonances obtained during each sweep through the predetermined range.

2. An apparatus for determining sound velocity in a fluid comprising a container having fixed lateral dimensions within which said fluid is confined, a transmitting transducer and a receiving transducer attached to opposing outer surfaces of said container, means for supplying electrical signals to said transmitting transducer and varying the frequency of said signals through a predetermined range, said frequency range being approximately 100 kilocycles centered in the neighborhood of one megacycle, thereby including a plurality of resonant frequencies of the fluid-filled container, and means connected to said receiving transducer for deriving a measure of the number of resonances obtained during each sweep through the predetermined range.

3. An apparatus for determining sound velocity in a fluid comprising a container having fixed lateral dimensions within which said fluid is confined, a transmitting transducer attached to an outer lateral surface of said container, a receiving transducer attached to an outer lateral surface of said container and spaced from said transmitting transducer, means for supplying electrical signals to said transmitting transducer and varying the frequency of said signals through a predetermined range of ultrasonic frequencies to include a plurality of resonant frequencies of the fluid-filled container, and means connected to said receiving transducer for deriving a measure of the number of resonances obtained during each sweep through the predetermined range.

4. An apparatus for determining sound velocity in a fluid comprising a container having fixed lateral dimensions within which said fluid is confined, a transmitting transducer attached to an outer lateral surface of said container, a receiving transducer attached to an outer lateral surface of said container and spaced from said transmitting transducer, means for supplying electrical signals to said transmitting transducer and varying the frequency of said signals through a predetermined range of approximately 100 kilocycles, thereby including a plurality of resonant frequencies of the fluid-filled container, and means connected to said receiving transducer for deriving a measure of the number of resonances obtained during each sweep through the predetermined range.

References Cited in the file of this patent

UNITED STATES PATENTS

| | | |
|---|---|---|
| 2,283,750 | Mikelson | May 19, 1942 |
| 2,384,716 | Wengel | Sept. 11, 1945 |
| 2,483,829 | Hershberger | Oct. 4, 1949 |
| 2,499,459 | Carlin | Mar. 7, 1950 |
| 2,550,528 | Carlin | Apr. 24, 1951 |
| 2,568,277 | Eltgroth | Sept. 18, 1951 |